United States Patent [19]

Mateer et al.

[11] Patent Number: 5,532,766

[45] Date of Patent: Jul. 2, 1996

[54] FOLDABLE EYEGLASSES HAVING LOCKING MEANS

[75] Inventors: David G. Mateer, Niwot, Colo.; D. Michael Pogue, Reston, Va.

[73] Assignee: Al W. Paulsen, Gillette, Wyo.

[21] Appl. No.: 534,644

[22] Filed: Sep. 27, 1995

[51] Int. Cl.[6] .............................. G02C 7/10; G02C 5/00
[52] U.S. Cl. .............................................. 351/63; 351/149
[58] Field of Search ............................. 351/63, 147, 149, 351/131, 158, 454

[56] References Cited

U.S. PATENT DOCUMENTS

| | | | |
|---|---|---|---|
| 1,097,198 | 5/1914 | Troppman | 351/63 |
| 1,159,751 | 11/1915 | Day | 351/63 |
| 1,915,707 | 6/1933 | Wingate | 351/63 |
| 1,936,319 | 11/1933 | Wingate | 351/63 |
| 2,065,122 | 12/1936 | Diggins | 351/63 |
| 2,275,999 | 3/1942 | Strauss | 351/63 |
| 2,814,968 | 12/1957 | Nixon, Jr. | 351/63 |
| 3,476,466 | 11/1969 | Hopkins | 351/115 |
| 3,528,728 | 9/1970 | Miyamoto | 351/141 |
| 4,400,067 | 8/1983 | Joffe | 351/59 |
| 4,526,448 | 7/1985 | Hanson | 351/153 |
| 4,681,410 | 7/1987 | Paulsen | 351/63 |
| 4,720,186 | 1/1988 | Douillard | 351/63 |
| 4,840,476 | 6/1989 | Rooney | 351/63 |
| 4,887,895 | 12/1989 | Tzeng | 351/63 |
| 4,887,896 | 12/1989 | Akagi | 351/63 |
| 5,028,126 | 7/1991 | Takeuchi | 351/63 |
| 5,208,616 | 5/1993 | Chang | 351/63 |
| 5,225,857 | 7/1993 | Sakamoto | 351/63 |
| 5,231,429 | 7/1993 | Kanda | 351/63 |
| 5,384,604 | 1/1995 | Chang | 351/63 |

*Primary Examiner*—Huy Mai
*Attorney, Agent, or Firm*—Dorr, Carson, Sloan & Birney

[57] ABSTRACT

Foldable eyeglasses having a first frame holding a lens and a second frame for holding a lens. The first frame has a first leaf and a second leaf with a predetermined space therebetween. At least one of the first or second leaves has a protrusion for locking the first frame to the second frame. The second frame has a third leaf with a complimentary detent for engaging the protrusion of the first frame. The first and second frames are rotably mounted together by a hinge allowing rotation about an axis extending through the first, second, and third leaves from a folded position wherein the frames are folded together to an open position wherein the third leaf rotates into the space between the first leaf and the second leaf and the protrusion engages the detent to lock the frames together.

20 Claims, 4 Drawing Sheets

FOLDABLE EYEGLASSES HAVING LOCKING MEANS

BACKGROUND OF THE INVENTION

1. Field of the Invention

The present invention relates generally to the field of eyeglasses, and more specifically, to foldable eyeglasses.

2. Statement of the Problem

The prior art contains numerous examples of various types of folding eyeglasses and goggles:

| Inventor | U.S. Pat. No. | Issue Date |
| --- | --- | --- |
| Sakamoto | 5,225,857 | 7/06/93 |
| Chang | 5,208,616 | 5/04/93 |
| Paulsen | 4,681,410 | 7/21/87 |
| Douillard | 4,720,186 | 1/19/88 |
| Rooney | 4,840,476 | 6/20/89 |
| Nixon | 2,814,968 | 12/03/57 |

These references disclose various ways of folding eyeglass frames to make them more compact or easier to carry or store. Sakamoto shows collapsible eyeglasses with a mechanism for collapsing the nose pad members when not in use. Chang shows folding spectacles with a hinged joint. Paulsen shows foldable eyeglasses that can be closed and stored in the form of a money clip. Douillard shows folding reading glasses that can be collapsed and stored in a watch compartment. Rooney shows foldable reading glasses with pivoting lenses. Nixon shows a hinged folding eyeglass frame. However, all of these references disclose foldable eyeglasses that are bulky and unsightly in comparison to conventional eyeglasses.

One variety that has been sold by SeeFold Optical Company of Fort Collins, Colo. for more than one year is shown in FIGS. 1(a)–(c). FIG. 1(a) shows SeeFold Optical Company's prior art foldable eyeglasses 12 in the folded state. As shown in FIG. 1(b), these prior art eyeglasses 12 have a first frame 14 and a second frame 16. The first frame 14 has a cam portion 18 having a first surface 22, a second surface 24, and a notch 26. The second frame 16 has a barrel portion 20 and a cantilevered locking bar 28. The first frame 14 is pivotably connected to the second frame 16 by a pivot bar 19 running through the barrel portion 20. As the second frame 16 rotates with respect to the first frame 14, the locking bar 28 rotates around the cam portion 18 being displaced by the corner 23 formed by the first 22 and second 24 surfaces as shown in FIG. 1(b). The locking bar 28 locks the frames 14 and 16 into the open position shown in FIG. 1(c) by resting in the notch 26 since closing the frames 14,16 would cause a displacement of the locking bar 28, which resists displacement, about the corner 23. As shown, while the prior art eyeglasses 12 are somewhat compact, the barrel portion 20, the locking bar 28, and the cam portion 18 are rather bulky and cause the eyeglasses 12 to differ in profile from conventional eyeglasses.

Aesthetics are very important in fashionable eyewear, and many persons might find the bulky features shown in the above references undesirable. The problem with these prior art eyeglasses is that none show foldable eyeglasses that are highly compact and selectively lock in the open position yet closely resemble the profile of modern fashion eyewear.

3. Solution to the Problem

The present invention provides foldable eyeglasses that are highly compact and selectively lock in the open position, yet, in the open position, have a profile that closely resembles the stylish, designer-type frames of conventional eyewear. More specifically, the present invention solves the above-stated problem by providing folding frames having three horizontal leaves. The frames rotate from a folded position where the front surface of the frames are together to an open position wherein a central leaf substantially fills the space between a top leaf and bottom leaf to form a bridge resembling that of conventional eyeglasses. Also, the leaves have a locking mechanism which, in the preferred embodiment, includes a protrusion on the top horizontal leaf and a complimentary detent on the central leaf.

SUMMARY OF THE INVENTION

In the preferred embodiment, the foldable eyeglasses of the present invention have a first frame having a first leaf spaced apart from a second leaf. The first leaf has a protrusion towards its end. The foldable eyeglasses have a second frame with a third leaf that fits between the first and second leaves of the first frame. The third leaf has a detent for interacting with the protrusion of the first leaf and a slot to accommodate the protrusion. The frames are pivotably connected to rotate about a vertical axis passing through the first, second, and third leaves from a folded position wherein the frames are folded together to an open position where the third leaf rotates into the space between the first and second leaves. In the open position, the protrusion engages the detent thereby locking the frames in the open position. The third leaf substantially fills the gap between the first and second leaves resulting in a fashionable appearance resembling the profile of designer-type frames.

BRIEF DESCRIPTION OF THE DRAWINGS

The present invention can be more readily understood in conjunction with the accompanying drawings in which.

DETAILED DESCRIPTION OF THE INVENTION

Figure 1A:
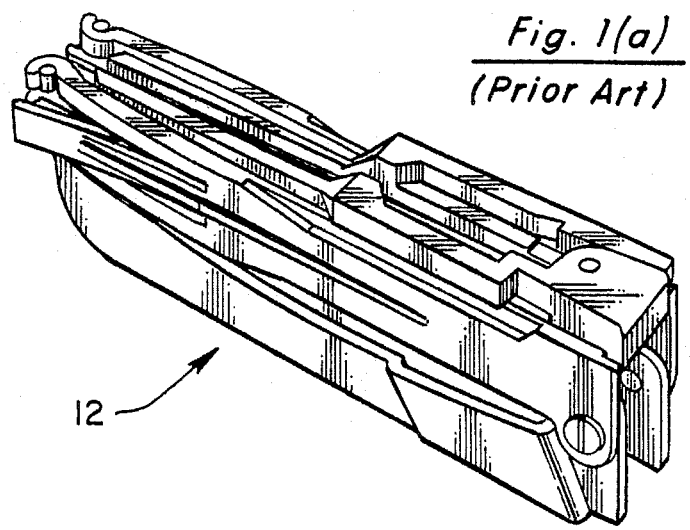
FIG. 1(a) is a perspective view of prior art foldable eyeglasses in the closed position.
Figure 1B:
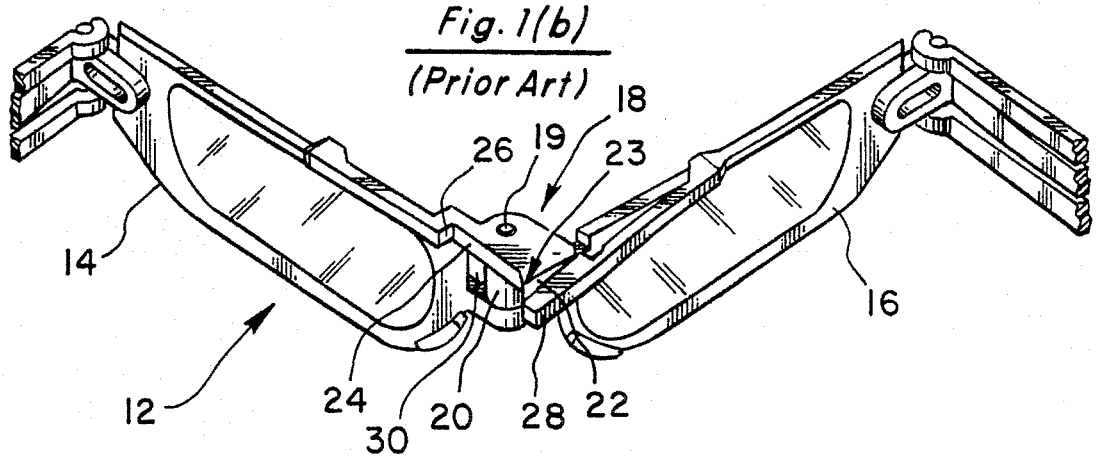
FIG. 1(b) is a perspective view of the prior art foldable eyeglasses of FIG. 1(a) in a partially opened position.
Figure 1C:
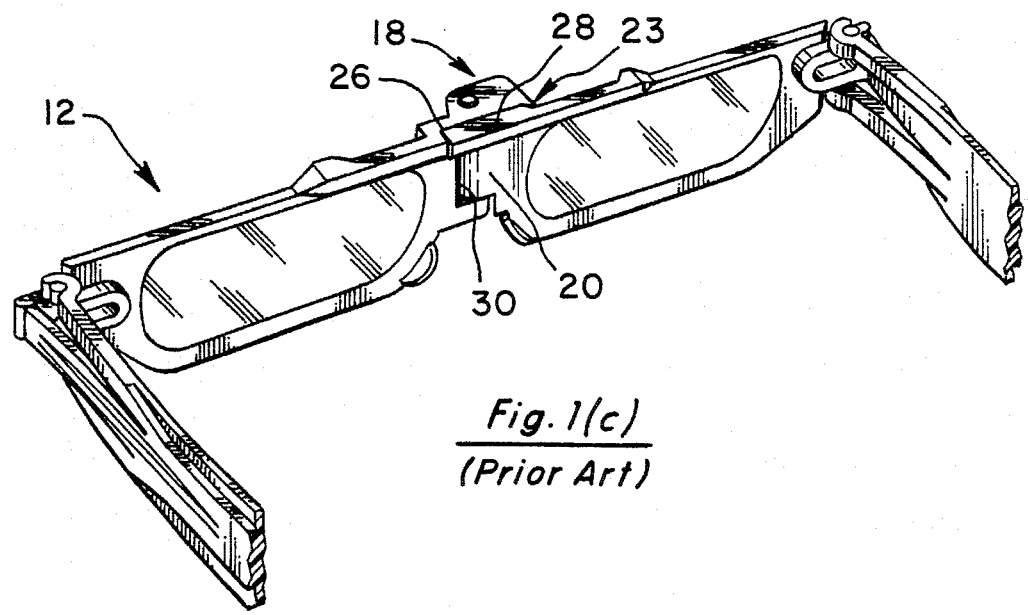
FIG. 1(c) is a perspective view of the prior art foldable eyeglasses of FIG. 1(a) in the fully opened position.
Figure 2:
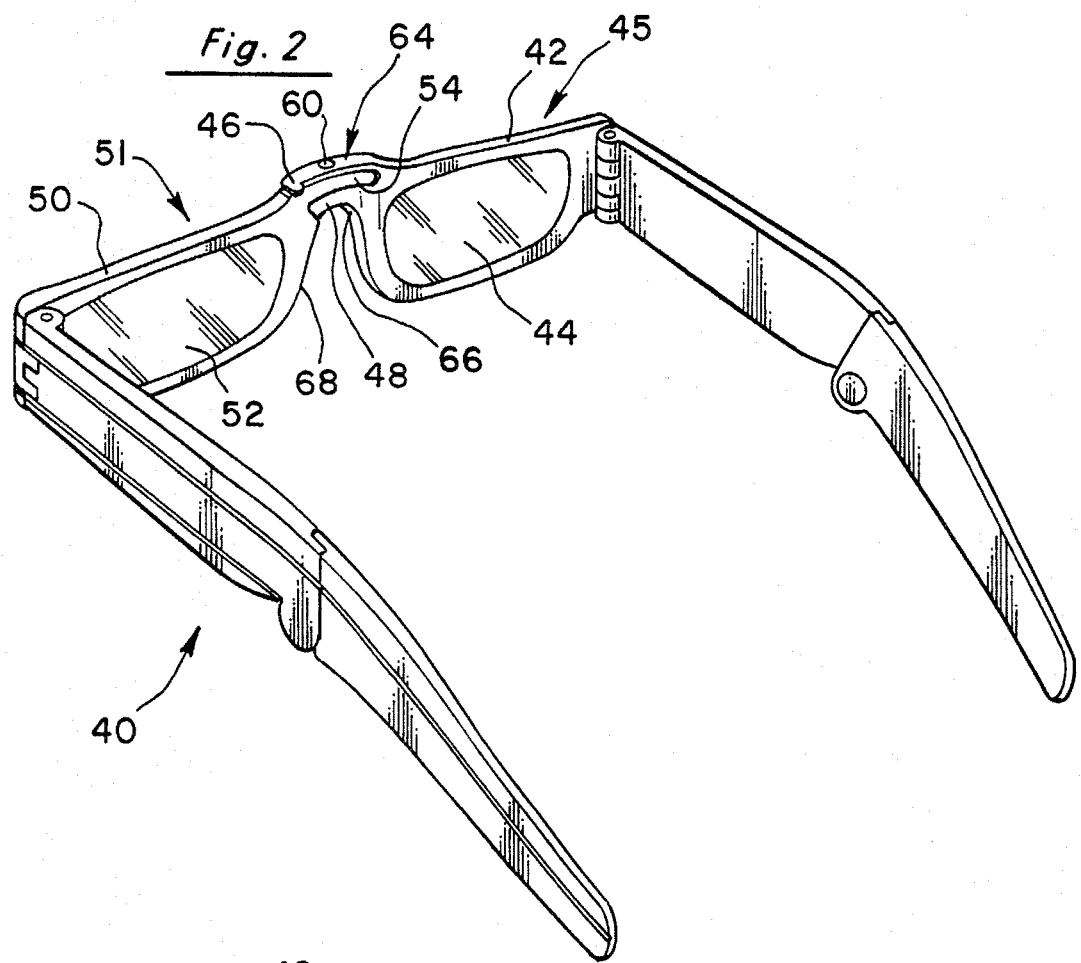
FIG. 2 is a perspective view of a preferred embodiment of the foldable eyeglasses of the present invention in the fully opened position.

In contrast to SeeFold's folding eyeglasses shown in FIG. 1(a)–1(c) and discussed above, a preferred embodiment of the foldable eyeglasses 40 is shown in the open or unfolded position in FIG. 2. ( Compare the profile of the foldable eyeglasses 40 of FIG. 2 to the profile of the prior art eyeglasses 12 in FIG. 1(c). Note that the bridge 64 of foldable eyeglasses 40 resembles the smooth contours ordinarily found in conventional designer-type frames thereby constituting an improvement over the prior art designs of foldable eyeglasses, such as the eyeglasses 12.

Figure 7:
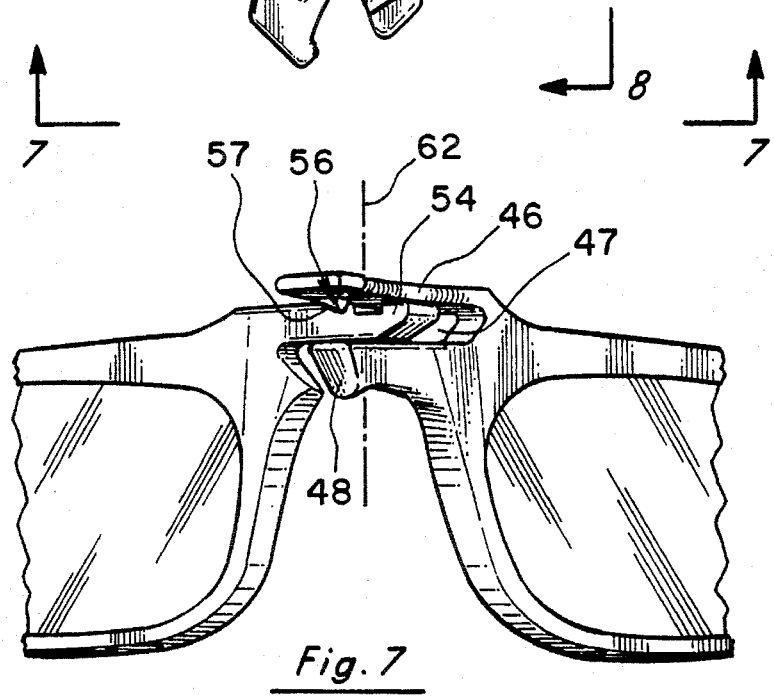
FIG. 7 is a frontal plane view of the foldable eyeglasses of FIG. 2 shown in the same position as shown in FIG. 6.

Referring to FIG. 2, the foldable eyeglasses 40 have a first frame 42 holding a lens 44. The first frame 42 has a front surface 45, a first leaf 46, and a second leaf 48, each leaf extending in a substantially horizontal direction with a predetermined vertical space 47 (best shown in FIG. 7) therebetween. The second leaf 48 of the first frame 42 also has a first lower surface 66 to rest on the nose of a wearer. As more clearly shown in FIG. 5, the first frame 42 has a protrusion 56 extending into the space 47. As more clearly shown in FIG. 7, the protrusion 56 has an angled surface 57.

Referring again to FIG. 2, the foldable eyeglasses 40 also include a second frame 50 holding a lens 52 and having a front surface 51 and a third leaf 54 with a horizontal surface 55 (shown in FIG. 4) extending in a substantially horizontal direction. The second frame 50 also includes a second surface 68 to rest on the nose of a wearer. As more clearly shown in FIG. 4, the third leaf 54 has a detent 58 with an angled surface 61 to complement and engage (as will be described below) the protrusion 56. The third leaf 54 also has a channel 59 for allowing passage of the protrusion 56.

Figure 3:
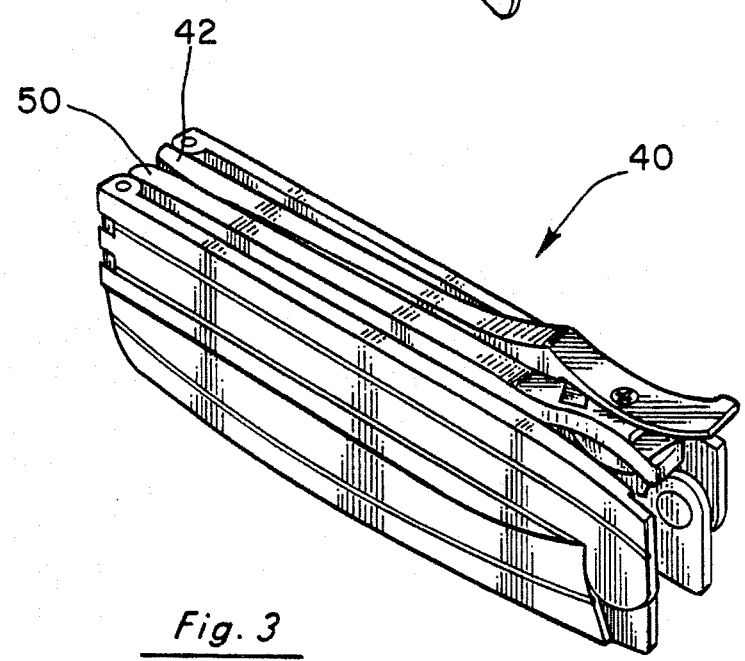
FIG. 3 is a perspective view of the foldable eyeglasses of FIG. 2 in the closed position.
Figure 4:
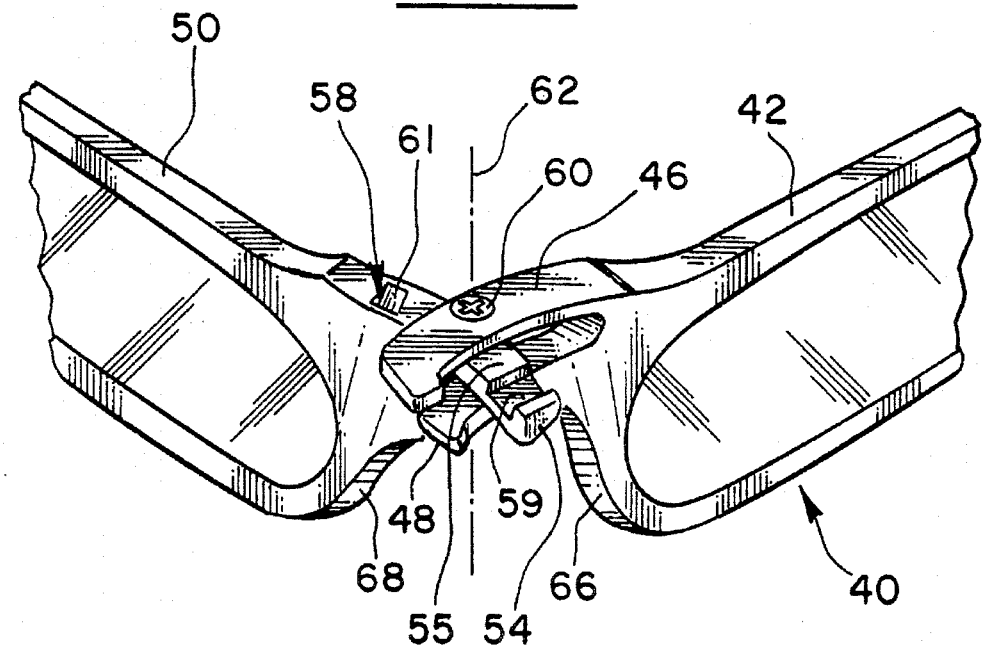
FIG. 4 is a top perspective view of the foldable eyeglasses FIG. 2 in a partially opened position.
Figure 5:
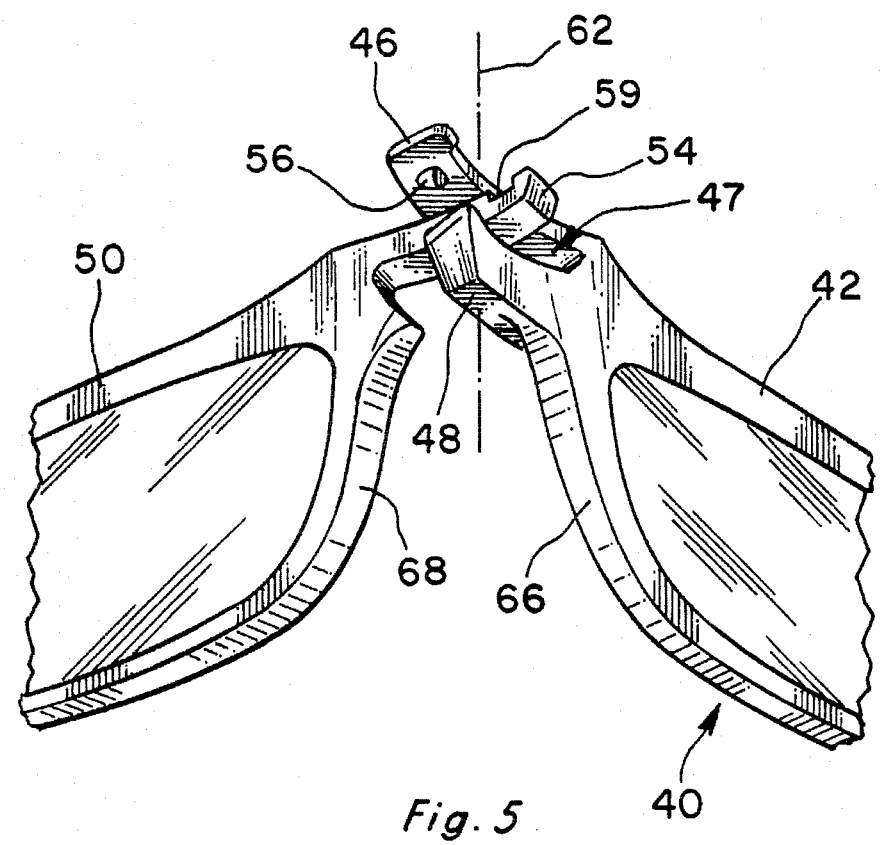
FIG. 5 is a bottom perspective view of the foldable eyeglasses of FIG. 2 in the same position as shown in FIG. 4.
Figure 6:
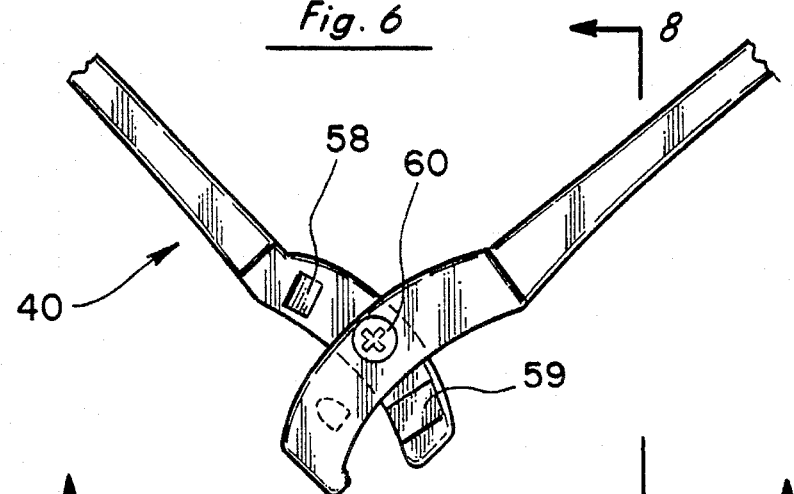
FIG. 6 is a top plane view of the foldable eyeglasses of FIG. 2 in the same position as shown in FIG. 4.
Figure 8:
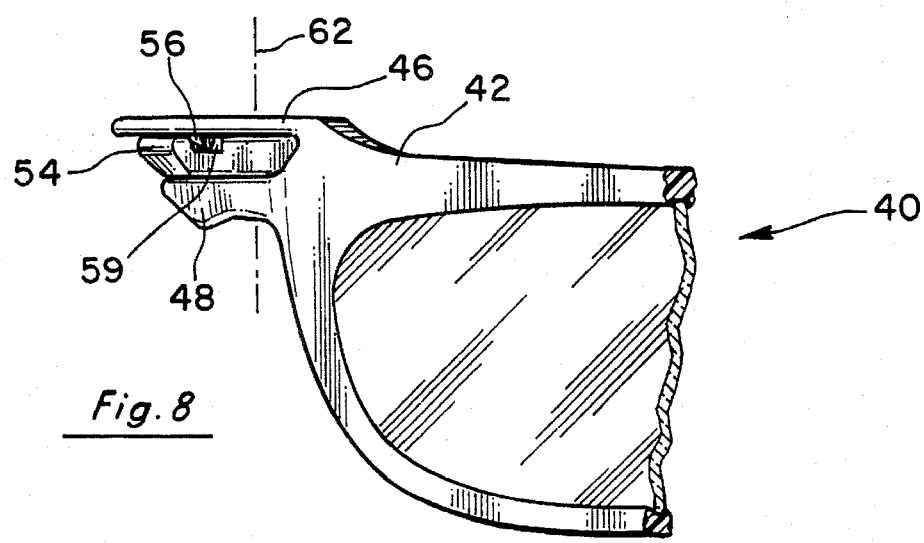
FIG. 8 is a side plane view of the foldable eyeglasses of FIG. 2 in the same position as shown in FIG. 6.

Referring to FIGS. 4 and 5, the first frame 42 is rotably mounted to the second frame 50 by hinge 60, which in this preferred embodiment is a conventional shoulder screw that acts as a pintle, but which could also include a small rod or molded posts. For example, small posts could be provided as an integral part of the third leaf 54, and holes provided in the first 46 and second 48 leaves enabling the first and second leaves 46, 48 to snap over the posts of the third leaf 54, thereby providing a hinge 60. The hinge 60 has a substantially vertical axis 62 extending through the first 46, second 48, and third 54 leaves and allows the flames 42, 50 to rotate about the axis 62. The detent 58 is positioned on the third leaf 54 so as to complement and interact with the protrusion 56. When the frames 42,50 rotate about the hinge 60 from a folded position where the front surfaces 45,51 are folded together (shown in FIG. 3) to an unfolded position (shown in FIG. 2), the first leaf 46 is pushed upward as the protrusion 56 contacts the third leaf 54, and then moves downward when the protrusion 56 engages the detent 58. The angled surface 57 assists in moving the first leaf 46 upward when the protrusion 56 contacts the third leaf 54. When the frames 42, 50 rotate about the axis 62, the channel 59 allows passage of the protrusion 56 (as best shown in FIG. 8). The engagement of the protrusion 56 and the detent 58 locks the frames 42,50 in the open or unfolded position (shown in FIG. 2). In this preferred embodiment, the first leaf 46 acts as a cantilever spring resisting upward movement. The resistance of the first leaf 46 to upward movement assists in locking the frames 42,50 in the open position. As shown in FIG. 2, the third leaf 54 rotates into and substantially fills the space 47 between the first 46 and second 48 leaves to form a bridge 64 for the foldable eyeglasses 40. In use in the open or unfolded position, the first lower surface 66 of the second leaf 48 of the first frame 42 opposes the second surface 68 of the second frame 50, each surface 66, 68 resting on the nose of a wearer. Thus, with the preferred embodiment 40, foldable eyeglasses 40 are provided in which the bridge 64 resembles that of conventional eyeglasses, having a slim, nonbulky profile yet locking firmly in the open position.

It is anticipated that many variations on the foldable eyeglasses 40 described above could be made by those skilled in the art that would nevertheless fall within the spirit and scope of the present invention. For instance, the protrusion 56, although shown on the first leaf 46, could instead be located on the second leaf 48 with a corresponding detent 58 located on the side of the third leaf 54 opposite that shown in FIG. 4. Likewise, the positions of the detent 58 and the protrusion 56 could be switched between the first 46 and third 54 leaves with the protrusion appearing on the third leaf 54. Several variations for the hinge 60 have been described above, including a shoulder screw, a pintle, a rod, or a snap-together construction involving a combination of molded posts and appropriate holes to provide rotation about the axis 62. Also, while it is believed that a vertical axis 62 provides for the most stylish and compact design, a hinge 60 could be provided allowing rotation about an axis perpendicular to the front surfaces 45,51 of the frames 42, 50.

Therefore, it should be understood that the particular embodiments shown in the drawings and described within this specification are for the purpose of example and should not be construed to limit the invention which will be described in the claims below. Now that a number of examples of the apparatus of the invention have been given, numerous other applications should be evident to one skilled in the art. Further, it is evident that those skilled in the art may now make numerous uses and modifications of the specific embodiments described without departing from the inventive concepts disclosed herein. It should be obvious that the various members described may be made from a variety of materials and using a wide combination of dimensions. Consequently, the invention is to be construed as embracing each and every novel feature and novel combination of the features present in or possessed by the apparatus described herein.

What is claimed is:

1. Foldable eyeglasses comprising:

a first frame holding a lens, said first frame having a first leaf and a second leaf with a predetermined space therebetween, at least one of said first leaf and said second leaf having locking means;

a second frame holding a lens and having a third leaf, said third leaf having complimentary locking means for engaging said locking means of said first frame; and hinge means for allowing rotation of said frames about an axis extending through said first, second, and third leaves from a folded position wherein said frames are folded together to an open position wherein said third leaf rotates into said space between said first leaf and said second leaf and said locking means of said first frame engages said locking means of said second frame.

2. The foldable eyeglasses of claim 1 wherein said locking means of said first frame comprises a protrusion extending into said space between said first leaf and said second leaf.

3. The foldable eyeglasses of claim 2 wherein said third leaf further comprises a channel to allow passage of said protrusion when said frames are rotated to said folded position.

4. The foldable eyeglasses of claim 2 wherein said locking means of said second frame comprises a detent on said third leaf.

5. The foldable eyeglasses of claim 4 wherein said protrusion further comprises an angled surface.

6. The foldable eyeglasses of claim 5 wherein said detent further includes an angled surface corresponding to said angled surface of said protrusion.

7. The foldable eyeglasses of claim 1 wherein said second leaf further comprises a lower surface to rest on the nose of a wearer.

8. The foldable eyeglasses of claim 1 wherein said frames rotate about a substantially vertical axis.

9. Foldable eyeglasses comprising:

a first frame having a front surface and a first leaf and a second leaf, each of said leaves extending in a substantially horizontal direction with a predetermined vertical space between said leaves, at least one of said first leaf and said second leaf having locking means;

said second frame having a front surface and a third leaf extending in a substantially horizontal direction, said third leaf having complimentary locking means for engaging said locking means of said first frame; and a hinge allowing rotation of said frames about a substantially vertical axis extending through said first leaf, second leaf, and third leaf; said frames rotating about said axis from a folded position wherein said front surfaces of said frames are folded together and said locking means of said first frame is disengaged from said locking means of said second frame, to an open position wherein said third leaf rotates to substantially fill said space between said first leaf and said second leaf to form a bridge for said eyeglasses and said locking means of said first frame engages said locking means of said second frame.

10. The foldable eyeglasses of claim 9 wherein said locking means of said first frame comprises a protrusion extending into said space between said first leaf and said second leaf.

11. The foldable eyeglasses of claim 10 wherein said third leaf of said second frame further includes a horizontal surface and a channel extending across said horizontal surface to allow passage of said protrusion when said frames are rotated to said folded position.

12. The foldable eyeglasses of claim 9 wherein said locking means of said second frame comprises a detent on said third leaf.

13. The foldable eyeglasses of claim 12 wherein said protrusion further comprises an angled surface.

14. The foldable eyeglasses of claim 13 wherein said detent further includes an angled surface corresponding to said angled surface of said protrusion.

15. The foldable eyeglasses of claim 9 wherein said second leaf further comprises a lower surface contoured to rest on the nose of a wearer.

16. Foldable eyeglasses comprising:

a first frame having a front surface, a first leaf, and a second leaf, each of said first and second leaves extending in a substantially horizontal direction with a predetermined vertical space between said leaves, said second leaf having a first lower surface to rest on the nose of a wearer, said first leaf having locking means;

a second frame having a front surface and a third leaf extending in a substantially horizontal direction, said second frame having a second surface to rest on the nose of a wearer, said third leaf having complimentary locking means for engaging said locking means of said first frame; and a pintle having a substantially vertical axis, said frames rotating about said substantially vertical axis extending through said first leaf, second leaf, and third leaf; said frames rotating about said pintle from a folded position wherein said front surfaces of said frames are folded together and said locking means of said first frame is disengaged from said locking means of said second frame, to an open position wherein said third leaf rotates to substantially fill said space between said first leaf and said second leaf to form a bridge for said eyeglasses, said locking means of said first frame engages said locking means of said second frame.

17. The foldable eyeglasses of claim 16 wherein said locking means of said first frame comprises a protrusion extending into said space between said first leaf and said second leaf.

18. The foldable eyeglasses of claim 17 wherein said third leaf further comprises a channel to allow passage of said protrusion when said frames are rotated to said folded position.

19. The foldable eyeglasses of claim 18 wherein said locking means of said second frame comprises a detent on said third leaf.

20. The foldable eyeglasses of claim 18 wherein said protrusion further comprises an angled surface.

* * * * *